(12) United States Patent
Pedersen et al.

(10) Patent No.: US 12,473,893 B2
(45) Date of Patent: Nov. 18, 2025

(54) WIND TURBINE BLADE MAINTENANCE PLATFORM

(71) Applicant: PP Energy ApS, Nordborg (DK)

(72) Inventors: Jesper Ankjær Pedersen, Kolding (DK); Lars Martensen, Sønderborg (DK); Peter Moos Junker, Kolding (DK); Jesper Juhl Christensen, Middelfart (DK)

(73) Assignee: PP ENERGY APS, Nordborg (DK)

( * ) Notice: Subject to any disclaimer, the term of this patent is extended or adjusted under 35 U.S.C. 154(b) by 0 days.

(21) Appl. No.: 18/730,985

(22) PCT Filed: Jan. 16, 2023

(86) PCT No.: PCT/EP2023/050796
§ 371 (c)(1),
(2) Date: Jul. 22, 2024

(87) PCT Pub. No.: WO2023/139005
PCT Pub. Date: Jul. 27, 2023

(65) Prior Publication Data
US 2025/0101959 A1  Mar. 27, 2025

(30) Foreign Application Priority Data
Jan. 24, 2022 (EP) .................................. 22152901

(51) Int. Cl.
*F03D 80/50* (2016.01)
(52) U.S. Cl.
CPC ......... *F03D 80/502* (2023.08); *F03D 80/501* (2023.08); *F05B 2230/80* (2013.01)

(58) Field of Classification Search
CPC ...... F03D 80/502; F03D 80/501; F03D 80/50; F05B 2230/80
See application file for complete search history.

(56) References Cited

U.S. PATENT DOCUMENTS

| | | |
|---|---|---|
| 1,658,670 A | 2/1928 | Corbett |
| 2,118,330 A | 5/1938 | Tarof |

(Continued)

FOREIGN PATENT DOCUMENTS

| | | |
|---|---|---|
| CN | 107035630 B | 3/2019 |
| CN | 111173692 A | 5/2020 |

(Continued)

OTHER PUBLICATIONS

International Search Report for PCT/EP2020/074687, dated Dec. 7, 2020.

(Continued)

*Primary Examiner* — Eldon T Brockman
(74) *Attorney, Agent, or Firm* — McCormick, Paulding & Huber PLLC

(57) ABSTRACT

A wind turbine blade maintenance platform (8) including a frame having a blade access area (20) structured and arranged to accommodate blade (6) of a wind turbine, a tower end (18), and a front end (19), and sealing means (21) structured and arranged to contact the blade (6) is described. Such a platform should allow working at the blade (6) even at rainy weather. To this end the sealing means (21) includes a drain path (25), wherein the drain path (25) opens into the blade access area (20).

20 Claims, 5 Drawing Sheets

(56) References Cited

U.S. PATENT DOCUMENTS

| | | |
|---|---|---|
| 3,121,470 A | 2/1964 | Stone et al. |
| 3,452,764 A | 7/1969 | Bell |
| 3,991,583 A | 11/1976 | Scurlock |
| 4,620,612 A | 11/1986 | Enoki et al. |
| 4,821,844 A | 4/1989 | Huffman et al. |
| 5,038,889 A | 8/1991 | Jankowski |
| 7,134,444 B2 | 11/2006 | Mintie et al. |
| 8,033,791 B1 * | 10/2011 | Watanabe ............... F03D 80/00 416/62 |
| 8,043,022 B2 | 10/2011 | Chau |
| 8,062,431 B2 | 11/2011 | Kumar et al. |
| 8,397,382 B2 | 3/2013 | Anasis et al. |
| 8,490,749 B2 | 7/2013 | Teichert |
| 8,500,403 B2 | 8/2013 | Grabau |
| 8,720,058 B2 | 5/2014 | Anasis et al. |
| 9,447,601 B2 | 9/2016 | Maillis et al. |
| 9,714,642 B2 | 7/2017 | Teichert |
| 9,828,787 B1 | 11/2017 | Thiessen |
| 10,352,062 B2 | 7/2019 | Fletcher |
| 10,704,288 B2 | 7/2020 | Fletcher |
| 10,718,317 B2 | 7/2020 | Jamuna |
| 10,801,220 B2 | 10/2020 | Oowaku et al. |
| 10,927,816 B2 | 2/2021 | Diget et al. |
| 11,525,435 B2 | 12/2022 | Pedersen et al. |
| 11,686,293 B2 | 6/2023 | Danielsen et al. |
| 2006/0225960 A1 | 10/2006 | Ferlin et al. |
| 2006/0291956 A1 | 12/2006 | Chau |
| 2007/0007074 A1 | 1/2007 | Lemburg et al. |
| 2008/0302605 A1 | 12/2008 | St-Germain et al. |
| 2010/0129229 A1 | 5/2010 | Grabau |
| 2010/0132738 A1 * | 6/2010 | Kumar ................ B08B 3/022 134/10 |
| 2011/0024233 A1 | 2/2011 | Lott |
| 2011/0140437 A1 | 6/2011 | Vemuri et al. |
| 2011/0167633 A1 | 7/2011 | Anasis et al. |
| 2011/0303488 A1 | 12/2011 | Besselink et al. |
| 2011/0318496 A1 * | 12/2011 | Jensen ................ F03D 80/50 118/712 |
| 2012/0168252 A1 | 7/2012 | Bogaert |
| 2016/0222692 A1 | 8/2016 | Maillis et al. |
| 2017/0030327 A1 | 2/2017 | Fletcher |
| 2019/0010714 A1 | 1/2019 | Oowaku et al. |
| 2019/0136836 A1 * | 5/2019 | Sanderson ............... B25J 21/02 |
| 2019/0162172 A1 | 5/2019 | Fletcher |
| 2019/0257295 A1 | 8/2019 | Müller et al. |
| 2020/0171552 A1 | 6/2020 | Hamamura et al. |
| 2023/0108569 A1 | 4/2023 | Canal Vila et al. |
| 2023/0407850 A1 | 12/2023 | Martensen et al. |

FOREIGN PATENT DOCUMENTS

| | | |
|---|---|---|
| CN | 115949557 B | 12/2023 |
| DE | 4336016 A1 | 4/1995 |
| DE | 19909698 C2 | 6/2001 |
| DE | 10118906 A1 | 11/2002 |
| DE | 202004016460 U1 | 12/2004 |
| DE | 202009002054 U1 | 6/2009 |
| DE | 102008019680 A1 | 11/2009 |
| DE | 102010011365 A1 | 9/2011 |
| DE | 102011100912 A1 | 3/2012 |
| DE | 102012001725 A1 | 8/2013 |
| DE | 202016106250 U1 | 11/2016 |
| EP | 0906483 A1 | 4/1999 |
| EP | 1115644 A | 7/2001 |
| EP | 1706636 A2 | 10/2006 |
| EP | 2414671 A1 | 2/2012 |
| EP | 2565440 A2 | 3/2013 |
| EP | 2718561 A2 | 4/2014 |
| EP | 2957538 A1 | 12/2015 |
| EP | 1604108 B1 | 5/2017 |
| EP | 3027900 B1 | 1/2019 |
| EP | 3438375 A1 | 2/2019 |
| EP | 3455005 A1 | 3/2019 |
| EP | 3485162 A1 | 5/2019 |
| EP | 3538797 B1 | 9/2020 |
| EP | 3995693 A1 | 5/2022 |
| EP | 3791066 B1 | 6/2022 |
| EP | 4215747 A1 | 7/2023 |
| EP | 4237685 A1 | 9/2023 |
| EP | 4367395 A1 | 5/2024 |
| GB | 2283046 A | 4/1995 |
| GB | 2518701 A | 4/2015 |
| GB | 2540900 B | 10/2017 |
| KR | 20140099339 A | 8/2014 |
| NL | 1030193 C1 | 4/2007 |
| WO | 9748863 A1 | 12/1997 |
| WO | 0017086 A1 | 3/2000 |
| WO | 2004081373 A2 | 9/2004 |
| WO | 2005064152 A2 | 7/2005 |
| WO | 2007033671 A1 | 3/2007 |
| WO | 2009121792 A2 | 10/2009 |
| WO | 2010112032 A1 | 10/2010 |
| WO | 2012167788 A2 | 12/2012 |
| WO | 2013102460 A1 | 7/2013 |
| WO | 2015155507 A1 | 10/2015 |
| WO | 2017194940 A1 | 11/2017 |
| WO | 2017215711 A1 | 12/2017 |
| WO | 2018010749 A1 | 1/2018 |
| WO | 2018086655 A1 | 5/2018 |
| WO | 2020058099 A1 | 3/2020 |
| WO | 2021242158 A1 | 12/2021 |
| WO | 2022093027 A1 | 5/2022 |
| WO | 2023280361 A1 | 1/2023 |

OTHER PUBLICATIONS

International Search Report for PCT/EP2020/074686, dated Nov. 23, 2020.

International Search Report for PCT/EP2021/081137, dated Jan. 21, 2022.

International Search Report for PCT/EP2019/074435, dated Dec. 17, 2019.

Extended European Search Report for European Pat. App. No. 20206653.6, dated Apr. 29, 2021.

International Search Report and Written Opinion for PCT/GB2015/051003, dated Jun. 5, 2015.

International Preliminary Report on Patentability for PCT/GB2015/051003, dated Oct. 12, 2016.

International Search Report mailed Apr. 17, 2023, in connection with corresponding International Application No. PCT/EP2023/050796; 3 pages.

* cited by examiner

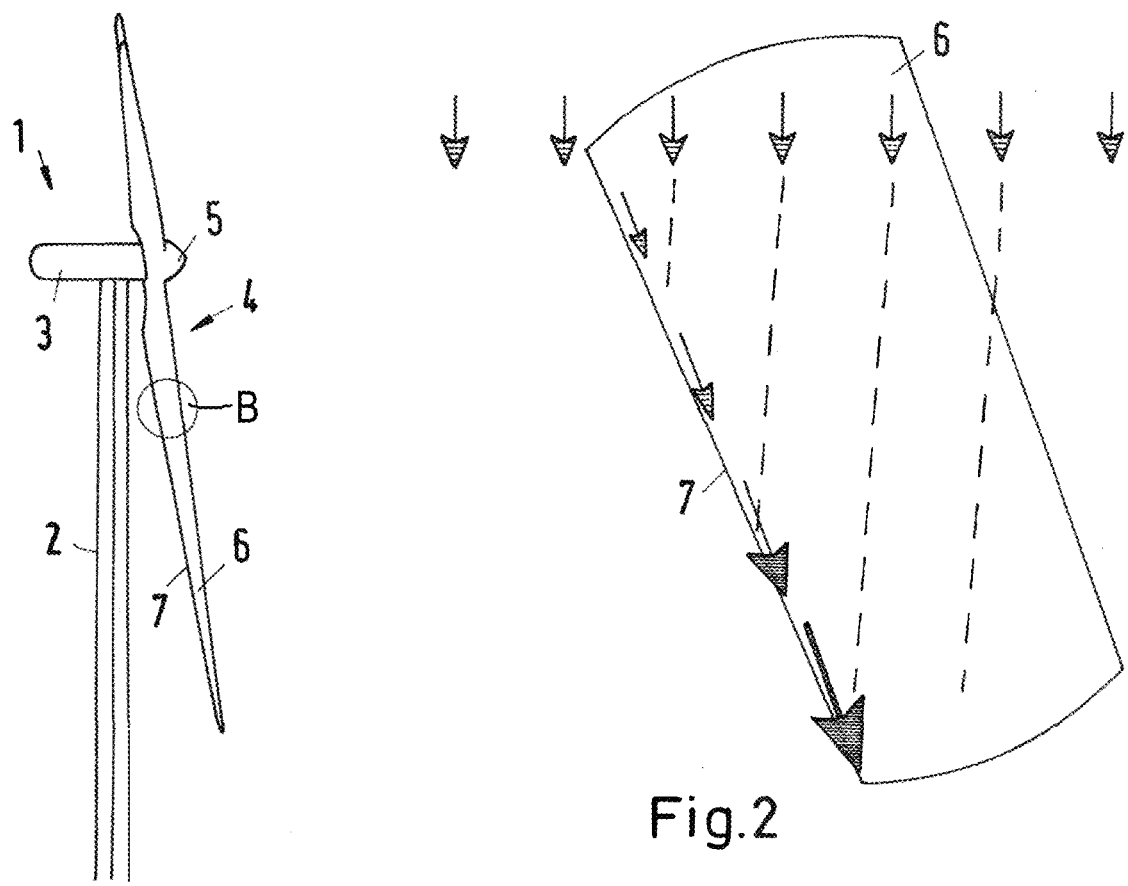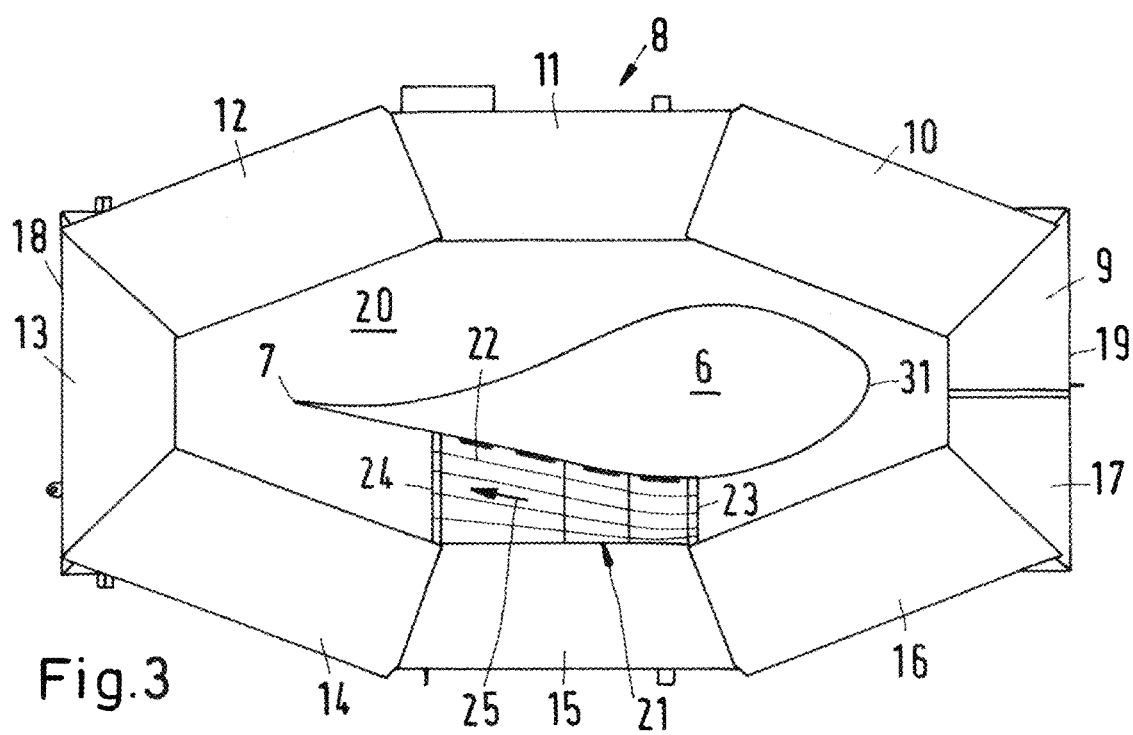

WIND TURBINE BLADE MAINTENANCE PLATFORM

CROSS-REFERENCE TO RELATED APPLICATIONS

This application is a National Stage application of International Patent Application No. PCT/EP2023/050796, filed on Jan. 16, 2023, which claims priority to European Patent Application No. 22152901.9, filed on Jan. 24, 2022, each of which is hereby incorporated by reference in its entirety.

TECHNICAL FIELD

The present invention relates to a wind turbine blade maintenance platform comprising a frame having a blade access area structured and arranged to accommodate a blade of a wind turbine, a tower end, and a front end, and sealing means structured and arranged to contact the blade.

BACKGROUND

Such a wind turbine blade maintenance platform is known, for example, from EP 3 538 797 B1.

DE 20 2016 106 250 U1 describes a sealing arrangement with a gap within a transverse direction of the gap and a gap length in longitudinal direction of the gap between a first and a second surface, wherein a stripe-shaped sealing element is arranged in the first surface over the gap length in the longitudinal direction of the gap and is pressed by means of at least one fastening element onto the first surface for sealing processes, and wherein a flat sealing element for bridging the gap within the transverse direction of the gap is connected on one end of the stripe-shaped sealing element and on the other end of the second surface.

WO 2017/194940 A1 describes an apparatus and method for repairing fibre-composite structures, wherein an enclosure is provided which can be sealed to the structure so that repair can be conducted at any desired time. The enclosure is large enough to enclose a desired work area with the apparatus hand and arms entering to carry out the work through hands and arm seals.

US 2019/0162172 A1 describes a temporary maintenance enclosure for maintenance of at least part of a turbine blade. The enclosure comprises a platform arranged to border at least of the circumference of a blade. At least one wall and a roof are carried by the platform. The roof extends from the wall towards the blade, wherein the wall extends from the platform. Further, the enclosure comprises a flexible sheath which seals onto the blade to provide the sealed volume for maintenance of said blade.

The blades of a wind turbine need from time to time an inspection and, if necessary, also a maintenance or repair. To this end a maintenance platform is used which is usually hoisted from the bottom up to a height in which it encloses the wind turbine blade. The platform comprises a tower end which is directed to the tower of the wind turbine and a front end which is directed in the opposite direction. In some embodiments of a maintenance platform the front end can be open to allow the insertion of the blade into the blade access area.

Once the blade is accommodated in the blade access area, the maintenance people can inspect the blade over the whole circumference. The inspection over the length of the blade is possible by raising or lowering the platform.

Inspection and maintenance of the blade of the wind turbine must be possible under nearly all-weather conditions, in particular even when it is raining. However, rainwater running down the rotor blade makes inspection difficult and maintenance almost impossible. If a defect is to be repaired, this usually requires a dry surface of the rotor blade.

SUMMARY

The object underlying the invention is to provide a platform which allows working at the rotor blade even under bad weather conditions.

This object is achieved with a wind turbine blade maintenance platform as described at the outset in that the sealing means comprise a drain path, wherein the drain path opens into the blade access area.

The region of the rotor blade below the sealing means can be kept dry. However, since the sealing means comprise a drain path opening into the blade access area, the rainwater needs not to flow over a cover of the platform, but can be drained directly through the blade access area. The rainwater flowing down the blade is separated from the blade by means of the sealing means. It is then directly guided over the sealing means to the blade access area without flowing over the cover of the platform. The load of the rainwater on the platform can be kept small, since the time in which the water remains on the platform is short due to the short distance between the sealing means and the end of the drain path where the water flows into the blade access area. The area of the blade to be repaired can be held in a condition of the right humidity.

In an embodiment of the invention the sealing means comprise a sealing area between a leading edge and a trailing edge of the sealing means, wherein the trailing edge is arranged facing the tower end of the platform and the drain path is arranged at the trailing edge. When a rotor blade has to be inspected or to be repaired, it is usually moved in a position in which it points downwardly in the direction of gravity. Many wind turbines have three blades, so that the remaining two blades point upwardly in the direction of gravity. In this position, rain is equally distributed over the area above the blades. Rain falls onto the blades and starts its flow along the blade. More and more water is collected as the flow moves towards the hub. Water from the two upper blades will pass the hub and flow along the downwards facing blade which is to be inspected or to be repaired. Due to the geometric designs and angle of hub and blade, a large portion of the water will start to flow on the trailing edge of the downwards facing blade. Thus, when the drain path is arranged at the trailing edge of the sealing means, the drain path is arranged in a position in which the most water is to be expected. When the blade is in position for maintenance, the trailing edge of the blade is usually directed to the tower of the wind turbine. The trailing edge of the sealing means and the trailing edge of the blade are in this case both arranged facing the tower of the wind turbine.

In an embodiment of the invention the sealing means form an upper border of a working space, the working space being laterally closed in the blade access area by means of wall elements, in particular wall elements which can be placed in different positions. Thus, the working conditions within the working space can be made to meet the requirements, for example for repairing a glass fiber damage of the blade. In this case a certain humidity range and a certain temperature range is required. The working space is thus limited by the blade, a wall of the working space at the side opposite the blade and some wall elements between the blade and the wall at the side opposite the blade. The wall elements can be, for example, in form of a canvas. They can be shifted, moved or repositioned to adjust a size of the working space to requirements of a repair.

In an embodiment of the invention the wall elements extend over a floor of the platform. In this case a rather small working space can be formed, wherein it is easier to maintain the desired conditions of humidity and temperature. Such a working space is in form of a "chamber" which needs not to be larger than necessary for the repair. The wall elements can be movable to adjust the size of the chamber according to the requirements.

In an embodiment of the invention the sealing means comprise a sealing element structured and arranged to contact the blade and a roof element, wherein the roof element forms at least part of the drain path. The water running down the blade is separated from the surface of the blade by means of the sealing element and directed to the roof element. The water then can flow over the roof element to the drain path. The roof element covers a part of the blade access area and keeps it dry.

In an embodiment of the invention the platform comprises a floor and a cover, wherein the roof element is arranged at a lower height in the direction of gravity than the cover. The floor is the element on which the operator can stand or walk. The cover is the upper limit of the working space in the direction of gravity, however, only in the area of the platform. In the blade access area, the upper limit of the working space is formed by the roof element, which can also be termed "temporary roof element". Thus, the water running down the blade is not directed over the cover but can flow directly over the roof element to the drain path. Thus, the risk of an untight cover through which water flowing down the blade can enter the working space between the bottom and the cover, can be kept small or even eliminated.

In an embodiment of the invention a size of the roof element can be changed from a working state to a stowing state. Thus, when the roof element is not needed, it can be stowed in a position of the working platform in which it does not disturb the inspection or maintenance of the blade.

In an embodiment of the invention the roof element can be folded or rolled. The roof element can in particular have a pleat or wave form which is positive for a good water control.

In an embodiment of the invention the roof element is connected to a support element. The roof element itself can then have a low mass. The mechanical stability is achieved by the support element.

In an embodiment of the invention the support element is connected to the sealing element. The support element is used to move the sealing element towards the blade. When the sealing element contacts the blade, it can be held in contact with the plate by, for example, suction cups, so that the support element is also held in a stable position and the roof element can form a flow basis for the rainwater.

In an embodiment of the invention the sealing means comprise at least one sealing segment. If the sealing segment is long enough to cover the desired working area, one segment is sufficient. If one segment is not sufficient to achieve the required rain protection, more segments can be used. The sealing segment can be fixed to a section of the platform. It is, however, also possible to move a sealing segment from one section to another section of the platform.

In an embodiment of the invention the sealing means comprise at least two sealing segments, wherein one sealing segment overlaps another sealing segment. Thus, water flowing over the first segment falls down to the next segment, so that there is no risk of water flowing into the desired working area.

In an embodiment of the invention the sealing segments are arranged in a staircase and rise away from the trailing edge. Thus, water flowing over the segment flows over the staircase down to the drain path.

In an embodiment of the invention the sealing segment is shorter than an average width of the blade. In many cases a repair or maintenance of the whole width of the blade is not necessary. Thus, the sealing segment needs to cover only a part of the width of the blade. This allows for a time and cost saving construction.

In an embodiment of the invention the platform comprises a number of platform sections and at least two platform sections are each provided with sealing means. Thus, the sealing means can be used in sections of the platform in which the workers are working. The area of the blade in which repairing can be performed, can be extended by connection of two or more sealing means or working spaces, wherein the connection of the sealing means produce a larger chamber. However, as long as a repair area is smaller than one chamber or working space, one sealing means, i.e., one chamber, is sufficient independently of where on the blade the repair area is positioned.

In an embodiment of the invention at least one of the sealing means has an extension along the platform which is larger than the extension of the platform section in the same direction. Thus, it is possible that the sealing means of adjacent platform sections can overlap each other.

In an embodiment of the invention the sealing means are inclined and descend in a direction to the tower end of the platform. Thus, water can run down an inclined surface so that the risk that water enters a working space is kept in a minimum.

BRIEF DESCRIPTION OF THE DRAWINGS

A preferred embodiment of the invention will now be described with reference to the drawing, in which:

FIG. 1 shows a schematical side view of a wind turbine,

FIG. 2 shows a detail B of FIG. 1,

FIG. 3 shows a top view of a maintenance platform in a working position,

DETAILED DESCRIPTION

Figure 4:
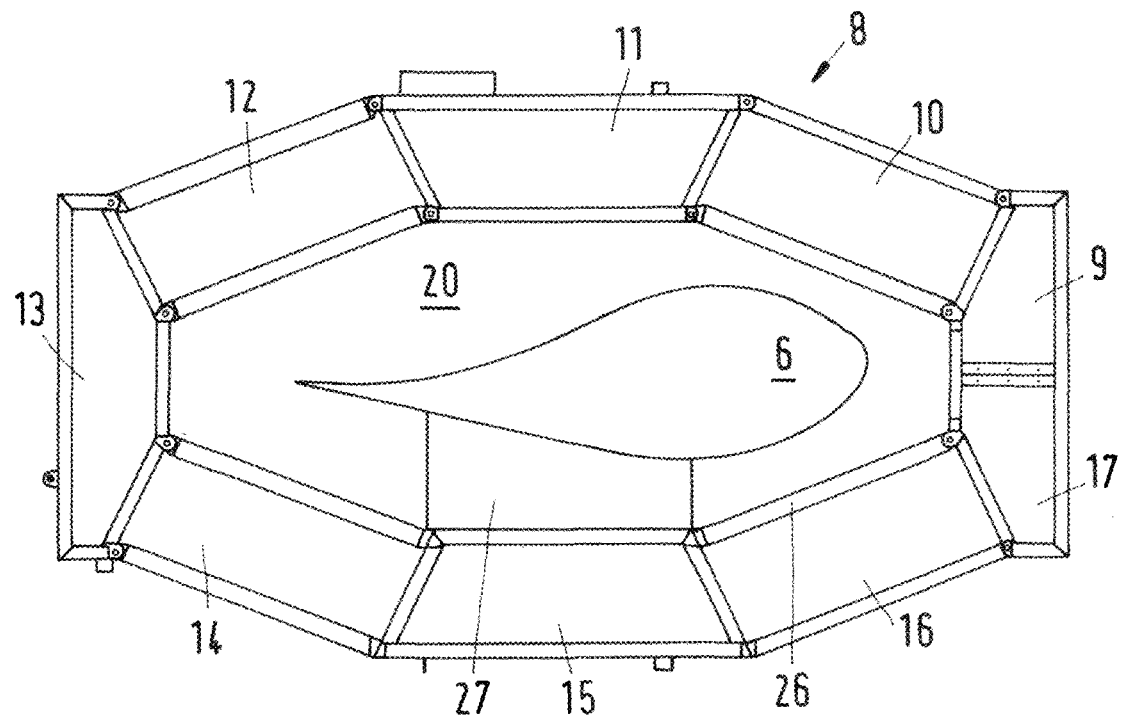
FIG. 4 shows a view according to FIG. 3 without a roof element.

FIG. 1 shows schematically a wind turbine 1 having a tower 2 and a nacelle 3. A rotor 4 of the wind turbine 1 is rotatably supported at the nacelle 3 by means of a hub 5. The rotor 4 comprises a number of rotor blades 6. In many cases the number of rotor blades 6 is three.

When a rotor blade 6 is to be inspected or repaired, it is usually moved into a safe position, for example in which it points downwardly in the direction of gravity. The edge of the rotor blade 6 is adjusted so that the wind cannot produce forces onto the rotor blade. When a wind turbine having three rotor blades 6 is used, the other two rotor blades point diagonally upwards.

Under bad weather condition, rain is equally distributed over an area above the blades. Rain falling onto the blade starts to flow along the blade. More and more water is collected as the flow moves toward the hub 5. Water from the two upper blades will pass the hub 5 and follow along the downwards facing blade 6. Due to the geometric design and angle of hub 5 and blade 6, a large portion of the water will start its flow on the trailing edge 7 of the rotor blade 6. This is schematically shown in FIG. 2 in which the flow path of the rainwater is shown with dashed lines. Flowing further down the blade 6, the water flow will increase and continue to collect at the trailing edge 7.

From time to time, it is necessary to inspect the blade 6 and, if a defect is detected, the blade 6 must be repaired. To this end a maintenance platform 8 is used which is shown in a top view in FIG. 3.

The blade maintenance platform 8 comprises a frame which is built by a number of platform sections 9-17, at least some of which are hinged together. The platform 8 comprises a tower end 18 which during operation faces the tower 2 and a front end 19 which is in operation farther away from the tower 2. Furthermore, the maintenance platform 8 comprises a blade access area 20 which is structured and arranged to accommodate the blade 6 of the wind turbine 1.

At least the platform sections 9, 17 at the front end 19 can be moved away from each other, so that the blade access area 20 is opened. In many cases the platform sections 9, 13, 16, 17 can be moved as well. However, this depends on the specific construction of the platform 8. The maintenance platform 8 is usually hoisted along the tower 2. When the necessary height is reached and the blade access area 20 is opened by moving the platform sections 9, 17 away from each other, the maintenance platform 8 can be moved away from the tower, so that the blade 6 can enter the blade access area 20. The platform sections 9, 17 can then be closed again.

In order to produce a dry area on the surface of the blade 6 in which a defect can be repaired, sealing means 21 are provided which are structured and arranged to contact the blade 6. To this end, the sealing means 21 comprise a number of suction cups 22 with which the sealing means 21 can be fixed to the blade 6 by suction, i.e., by a pressure below atmospheric pressure. The suction cups 22 are positioned below the sealing means 21.

In FIG. 3, the sealing means 21 are provided at the platform segment 15. However, it is clear that other platform sections, in particular platform sections 10-12 and 14-16 can be provided with sealing means 21 as well. As it is shown in FIG. 3, the sealing means 21 have a width which may be larger than the corresponding width of the platform section 15.

The sealing means 21 comprise a leading edge 23 and a trailing edge 24. The trailing edge 24 is arranged towards the tower end 18 of the maintenance platform 8. The sealing means 21 are slightly inclined downwardly from the leading edge 23 to the trailing edge 24, so that rainwater or other water running down the blade 6 flows over the sealing means 21 towards the trailing edge 24 and from there through the blade access area 20 to the ground.

In other words, the sealing means 21 comprise a drain path 25 (illustrated as an arrow) opening into the blade access area 20. Thus, there is no water load on the covers of the platform section 9-17 stemming from water from the blade 6. The drain path 25 is the area on the sealing means 21 in which rainwater flows from the blade 6 to the blade access area 20.

FIG. 4 shows a view similar to FIG. 3. However, the sealing means 21 and covers of the platform sections 9-17 have been removed, so that some safety means 26 can be seen. The safety means 26 (only the corresponding enclosure wall 26 is labelled in platform section 16) form a kind of protection protecting an operator.

On the side facing away from the blade access area 20 the platform 8 comprises walls, for example in form of a canvas or the like. Together with a floor 39 (FIG. 8) and a cover 40 (FIG. 10) they form a protection against bad weather conditions. The space enclosed by the walls, the floor 39 and the cover 40 is still open to the blade access area.

In order to form a working space in which defined conditions of humidity and temperature can be maintained, lateral wall elements 44, 45 (FIGS. 11 to 13) are provided between the sealing means 21 and the platform 8. These lateral wall elements 44, 45 can extend over the floor 38 of the platform. They can be movable and, for example, can be folded or deformed in another way to be adapted to different distances between the blade 6 and the platform 8. They are arranged below the sealing means 21 in the direction of gravity, so that no rainwater can enter the working space. The lateral wall elements can have a distance to each other (in a direction from the trailing edge 18 to the leading edge 19 of the platform 8) which is smaller than the extension of the sealing means 21 in the same direction. This distance can be adapted to the size of the working space required or wanted, so that there is a great flexibility in the size of the working space.

Platform section 15 is provided with an extendable bottom cover 27 which can be moved towards the blade 6, for example in form of a canvas so that the working space is also closed from the bottom.

Figure 5:
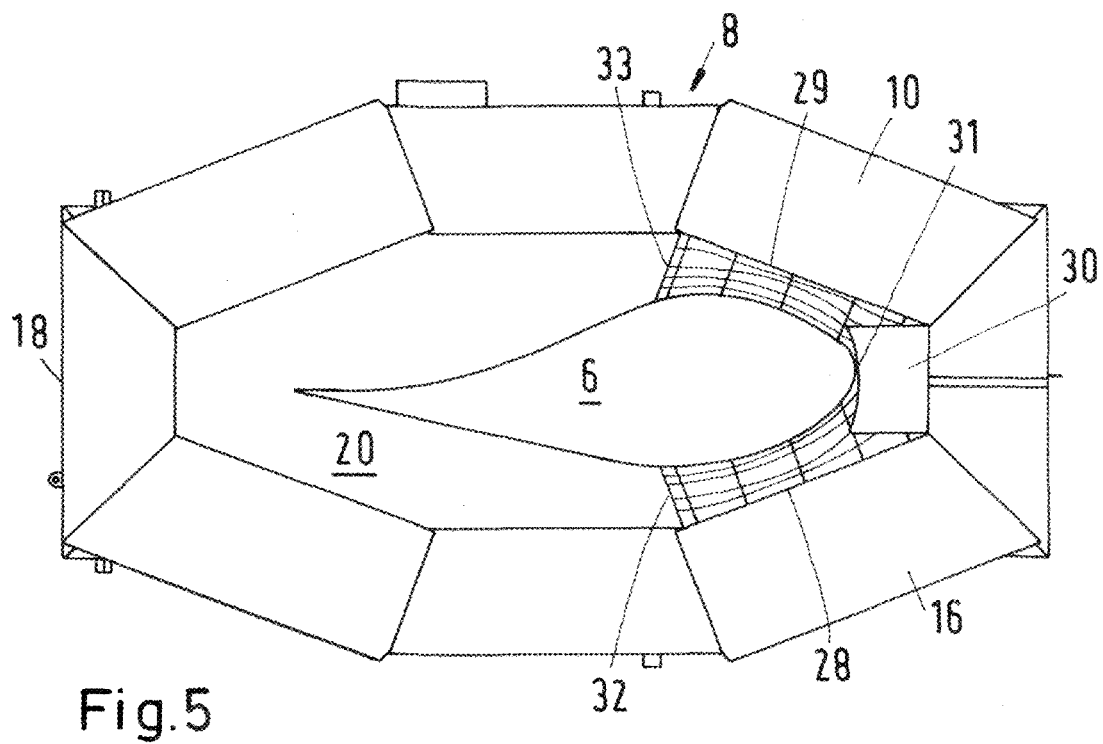
FIG. 5 shows a view similar to FIG. 3, however, with a working area at another position.

FIG. 5 shows the working platform 8 in a condition in which another area on the surface of the blade 6 is to be inspected or to be repaired. To this end other sealing means 28 are provided at the platform sections 16 and further sealing means 29 are provided at platform section 10. In addition, a cover 30 is used at the leading edge 31 of the blade 6 to cover a triangular gap which may occur between the sealing means 28, 29. It is also possible to move sealing means 21 in the position shown for sealing means 28.

Again, the sealing means 28, 29 are inclined towards the respective trailing edges 32, 33 which are closer to the tower end 18, so that water running down the blade 6 can directly flow into the blade access area 20.

Figure 6:
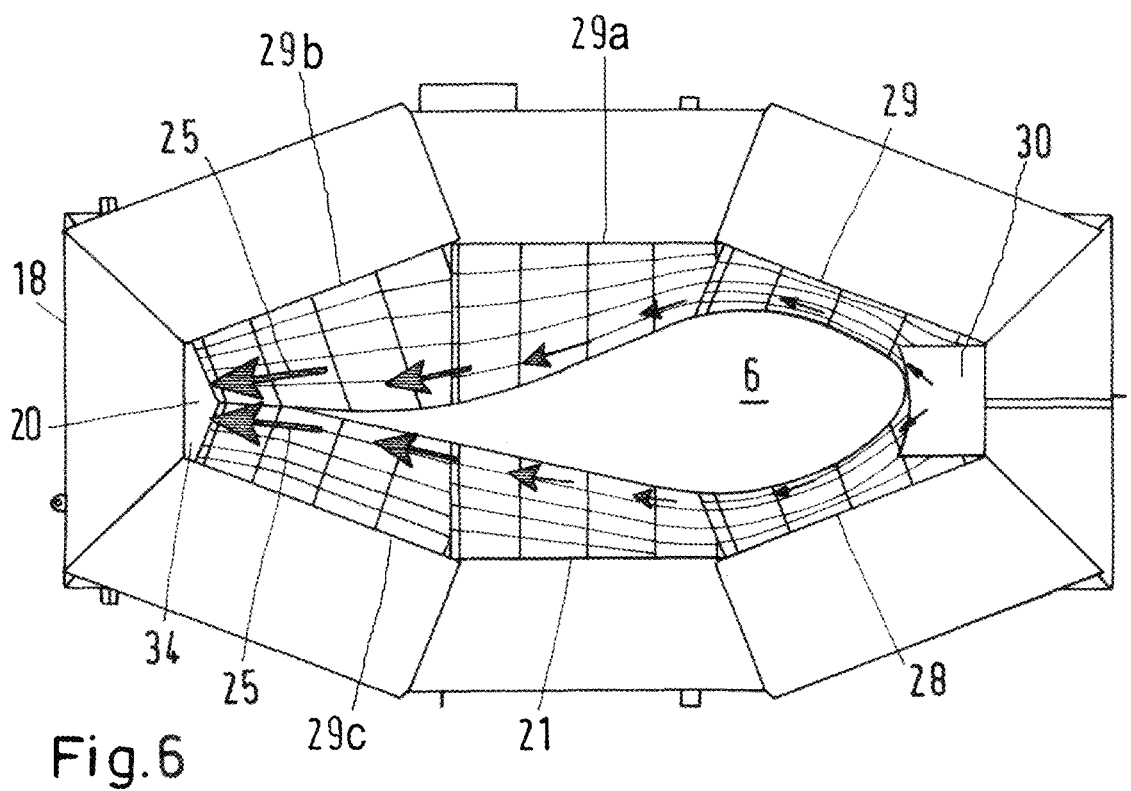
FIG. 6 shows a top view of the maintenance platform to illustrate a drain path.

FIG. 6 shows a situation, in which nearly the whole blade access area 20 is covered by sealing means 21, 28, 29, 29a, 29b, 29c with exception of a small area 34 through which rainwater can directly flow to the ground. The drain path is again shown by arrows 25. At the end of the platform 8 opposite the trailing edge 18 the small cover 30 is again provided.

Figure 7:
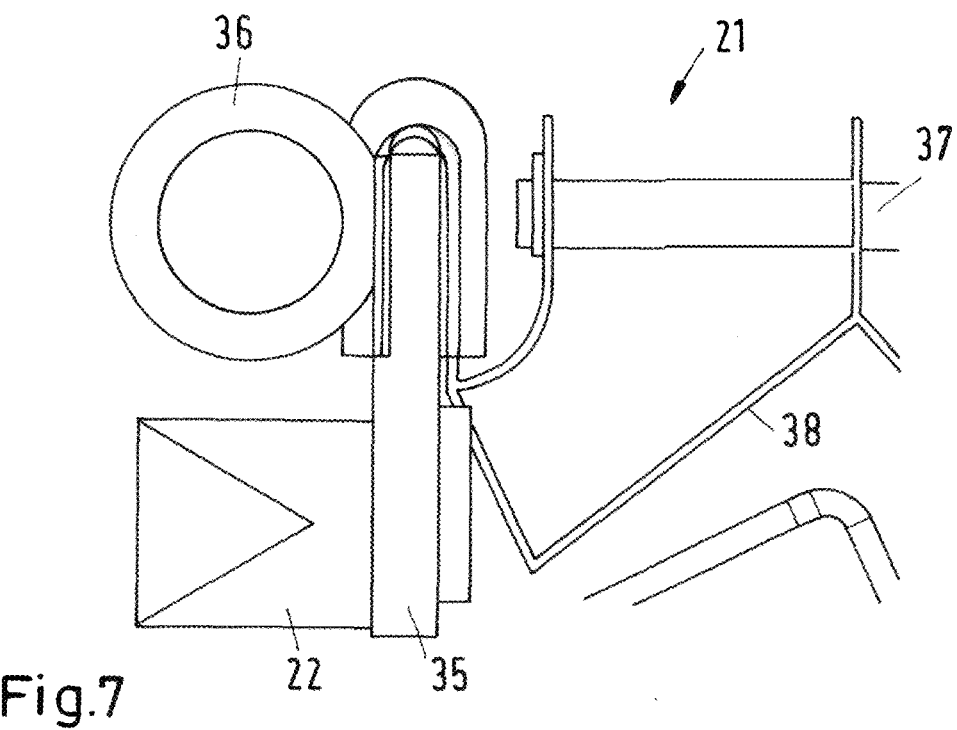
FIG. 7 shows schematically sealing means and a roof element.

FIG. 7 shows more details of the sealing means 21. The other sealing means 28, 29 are of a similar construction. It should be noted that each platform section can be provided with its own sealing means 21. However, it is also possible, that at least one sealing means 21 is movable from one platform section to another one.

Figure 10:
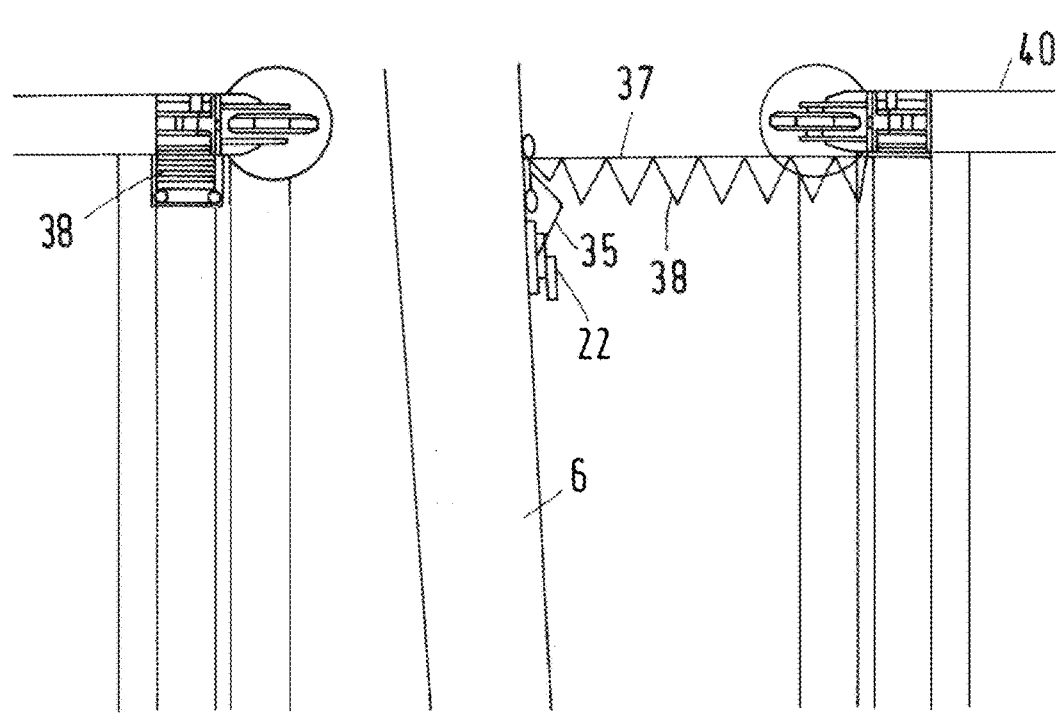
FIG. 10 shows a rotor blade having a repair area which is covered by a roof element.

The sealing means 21 comprises a carrier 35 carrying the suction cups 22. Furthermore, the carrier 35 carries a sealing element 36, for example in form of an inflatable tube or another flexible element. Furthermore, the carrier 35 is connected to a support element 37. The support element 37 is connected to the platform section 15. A roof element 38 is connected to the support element 37. The roof element 38 can be folded or rolled, as it is shown in FIG. 10. The roof element 38 can be changed from a working stage (on the right-hand side of the blade 6 in FIG. 10) to a stowing stage as shown on the left-hand side of the blade 6 in FIG. 10).

Figure 8:
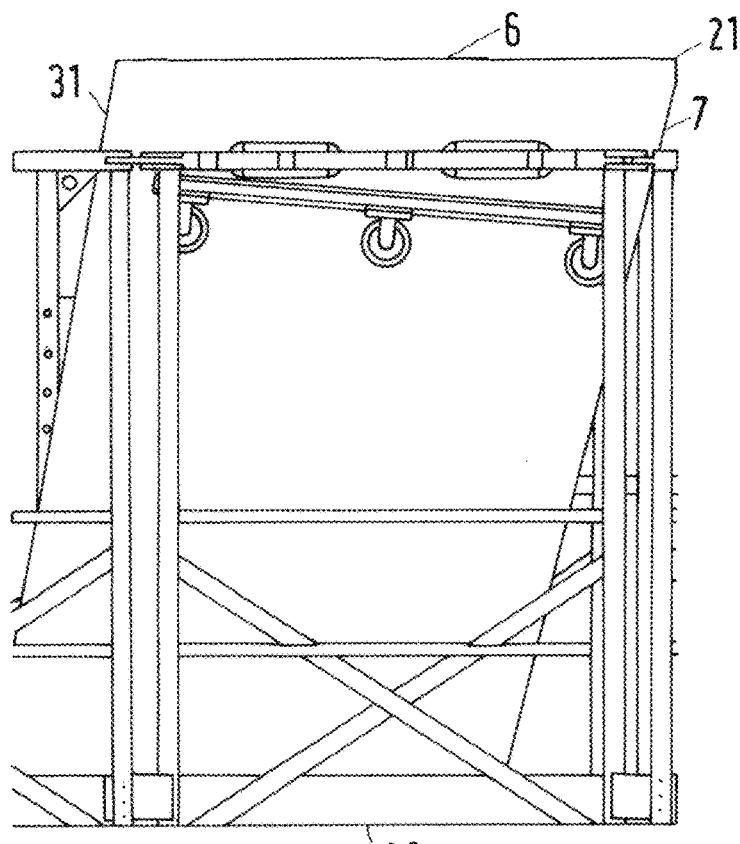
FIG. 8 shows a side view of a part of the maintenance platform.

The working platform sections 9-17 have the floor 39 which is shown in FIG. 8 and the cover 40 which is shown in FIG. 10. The roof element 38 covers a distance between the cover 40 and the blade 6. As can be seen in FIG. 10, the roof element 38 is arranged at a lower height in the direction of gravity than the cover 40. The roof element 38 forms at least part of the drain path, so that water running down the surface of the blade 6 flows only over the roof element 38 and cannot flow over the cover 40, so that the water load onto the cover 40 is kept at a minimum.

As can be seen in FIG. 8, the sealing means 21 are inclined, i.e., a height in the direction of gravity at the trailing edge 7 of the blade 6 is lower than an end of the sealing means 21 at the leading edge 31 of the blade 6. The angle of inclination is in a range from 1° to 15°, for example, 5°.

Figure 9:
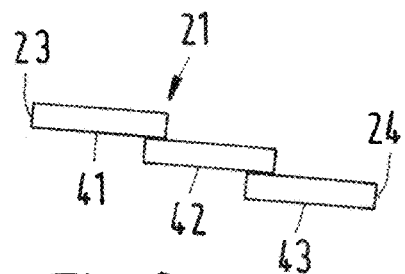
FIG. 9 shows schematically a staircase-like arrangement of sealing segments.

When the sealing element 21 is made from more than one sealing segment 41-43, as shown in FIG. 9, the sealing segments 41-43 are arranged in a staircase and overlap each other, so that water is directed to the trailing edge of the blade 7.

Figure 11:
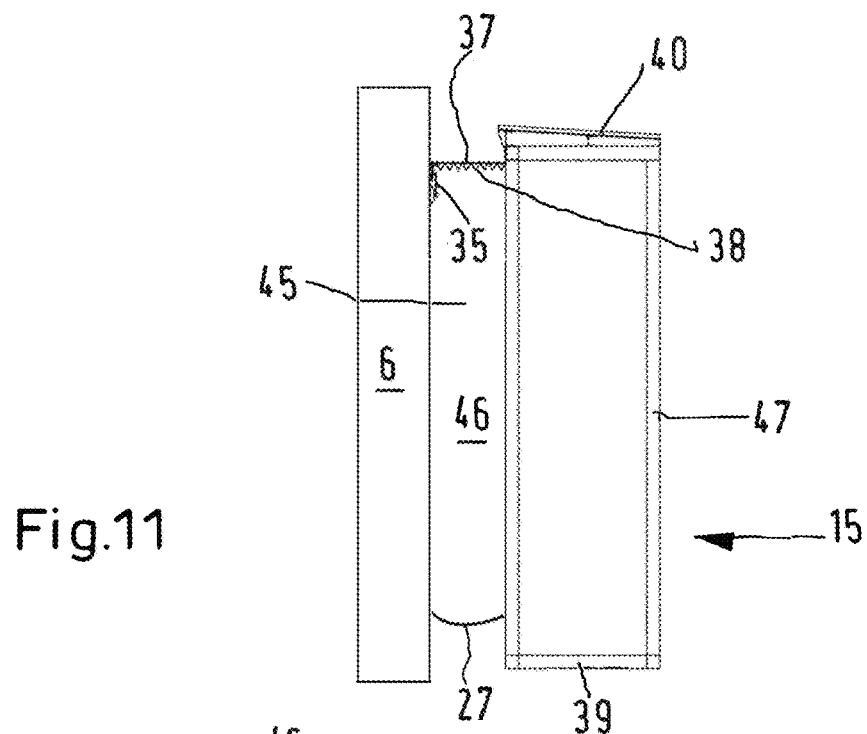
FIG. 11 shows schematically a side view of a platform section and the blade.

FIG. 11 shows platform section 15 and the blade 6 in a schematic side view. The platform section 15 is provided with an outer wall 47. Such outer walls 47 and covers 40 are provided on all platform sections 9-17, so that an operator working on the platform 8 is already protected from bad weather conditions. The support element 37 is fixed to the blade 6 by means of the carrier 35. The roof 38 fixed to the support element 37 has been unfolded or unrolled to cover the distance between the blade 6 and the cover 40 of the platform section 15 thus forming a working chamber 46. The working chamber 46 is laterally closed by the wall elements 45 (and 44 on the opposite side, FIGS. 12 and 13). The bottom of the working chamber 46 is closed by means of the bottom cover 27, so that the working chamber is even more protected than the rest of interior of the platform 8. In this working chamber 46 it is possible to produce an atmosphere having the desired temperature and humidity.

Figure 12:
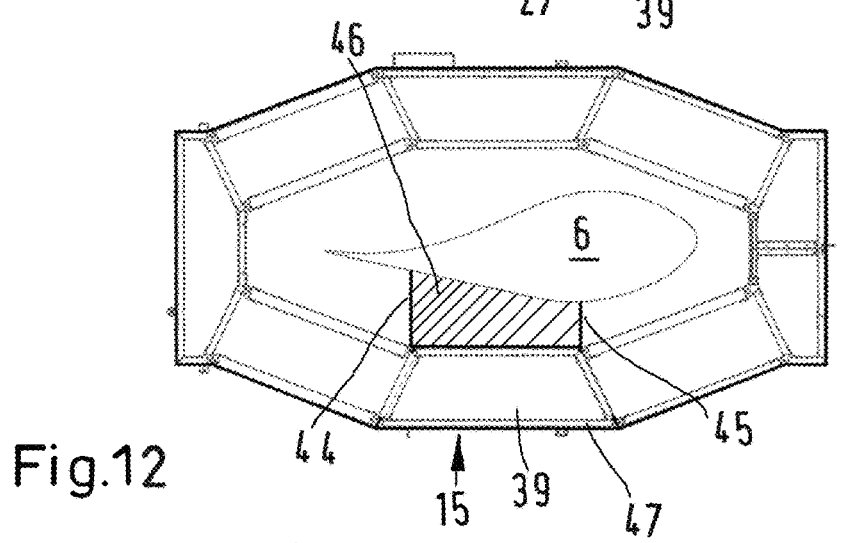
FIG. 12 shows a view similar to FIG. 4 illustrating a working chamber.
Figure 13:
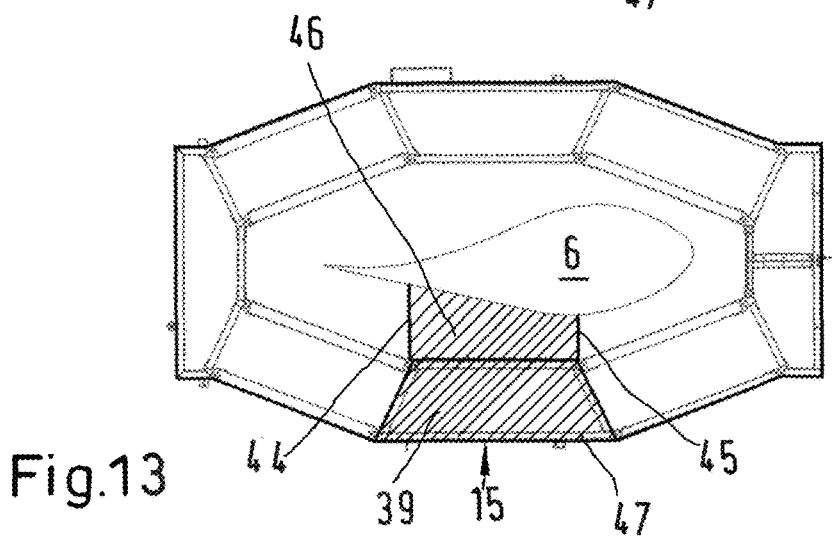
FIG. 13 shows a view similar to FIG. 12 illustrating another size of the working chamber In all Figures the same elements are denoted with the same reference numerals.

FIGS. 12 and 13 show schematically a top view (without cover 40) of the platform 8. FIG. 12 shows the working chamber 46 having a minimum size. Only the distance between the blade 6 and the platform section 15 is closed by the lateral wall elements 44, 45. In FIG. 13 the lateral wall elements 44, 45 are extended over the floor 39 of the platform section 15, so that the working chamber 46 is larger and can be completely closed, even in the area of the floor 39 of the platform section 15.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wind turbine blade maintenance platform comprising a frame having a blade access area structured and arranged to accommodate a blade of a wind turbine, a tower end, a front end, a cover, and sealing means structured and arranged to contact the blade, wherein the sealing means comprise a drain path, wherein the drain path opens into the blade access area such that rainwater flowing down the blade is separated from the blade by means of the sealing means and is then directly guided over the sealing means to the blade access area without flowing over the cover of the platform.

2. The maintenance platform according to claim 1, wherein the sealing means comprise a sealing area between a leading edge and a trailing edge of the sealing means, wherein the trailing edge is arranged facing the tower end of the platform and the drain path is arranged at the trailing edge.

3. The maintenance platform according to claim 1, wherein the sealing means form an upper border of a working space, wherein the working space is laterally closed in the blade access area by means of wall elements, in particular wall elements which can be placed in different positions.

4. The maintenance platform according to claim 3, wherein the wall elements extend over a floor of the platform.

5. The maintenance platform according to claim 1, wherein sealing means comprise a sealing element structured and arranged to contact the blade and a roof element, wherein the roof element forms at least part of the drain path.

6. The maintenance platform according to claim 5, wherein the roof element is arranged at a lower height in the direction of gravity than the cover.

7. The maintenance platform according to claim 5, wherein a size of the roof element can be changed from a working state to a stowing state, in particular that the roof element can be folded or rolled.

8. The maintenance platform according to claim 5, wherein the roof element is connected to a support element.

9. The maintenance platform according to claim 8, wherein the support element is connected to the sealing element.

10. The maintenance platform according to claim 1, wherein the sealing means comprise at least one sealing segment.

11. The maintenance platform according to claim 10, wherein the sealing means comprise at least two sealing segments, wherein one sealing segment overlaps another sealing segment, in particular in a staircase and rise away from the trailing edge.

12. The maintenance platform according to claim 10, wherein the sealing segment is shorter than an average width of the blade.

13. The maintenance platform according to claim 1, wherein the platform comprises a number of platform sections and at least two platform sections are each provided with sealing means.

14. The maintenance platform according to claim 13, wherein at least one of the sealing means has an extension along the platform which is larger than the extension of the platform section in the same direction.

15. The maintenance platform according to claim 1, wherein the sealing means are inclined and descend in a direction to the tower end of the platform.

16. A wind turbine blade maintenance platform comprising a frame having a blade access area structured and arranged to accommodate a blade of a wind turbine, a tower end, and a front end, a cover, a sealing element structured and arranged to contact the blade, and a roof element extending from the sealing element and forming at least part of a drain path, wherein the drain path opens into the blade access area such that rainwater flowing down the blade is separated from the blade by means of the sealing element and is then directly guided over the roof element to the blade access area without flowing over the cover of the platform.

17. The maintenance platform according to claim 16, wherein the sealing element and the roof element form a sealing area between a leading edge and a trailing edge of the roof element, wherein the trailing edge is arranged facing the tower end of the platform and the drain path is arranged at the trailing edge.

18. The maintenance platform according to claim 16, wherein the roof element is arranged at a lower height in the direction of gravity than the cover.

19. The maintenance platform according to claim 16, wherein a size of the roof element can be changed from a working state to a stowing state, in particular that the roof element can be folded or rolled.

20. The maintenance platform according to claim 16, wherein the sealing element is inclined and descends in a direction to the tower end of the platform.

\* \* \* \* \*